United States Patent
Osmak

(10) Patent No.: US 10,282,397 B1
(45) Date of Patent: *May 7, 2019

(54) CONTENT MANAGEMENT SYSTEM EMPLOYING A HYBRID WEB APPLICATION FRAMEWORK

(71) Applicant: Telerik, AD, Sofia (BG)

(72) Inventor: Ivan Osmak, Sofia (BG)

(73) Assignee: Progress Software Corporation, Bedford, MA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/159,283

(22) Filed: May 19, 2016

Related U.S. Application Data

(63) Continuation of application No. 13/799,431, filed on Mar. 13, 2013, now Pat. No. 9,355,077.

(60) Provisional application No. 61/669,930, filed on Jul. 10, 2012.

(51) Int. Cl.
*G06F 17/00* (2006.01)
*G06F 17/22* (2006.01)
*G06F 17/24* (2006.01)
*G06F 17/30* (2006.01)

(52) U.S. Cl.
CPC ........ *G06F 17/2247* (2013.01); *G06F 17/243* (2013.01); *G06F 17/248* (2013.01); *G06F 17/30887* (2013.01); *G06F 17/30899* (2013.01); *G06F 17/30905* (2013.01)

(58) Field of Classification Search
CPC .......................... H04L 67/10; G06F 17/30867
USPC ................................................ 715/234, 200
See application file for complete search history.

(56) References Cited

U.S. PATENT DOCUMENTS

| | | |
|---|---|---|
| 8,549,469 B2 | 10/2013 | Bolarinwa |
| 2008/0077915 A1 | 3/2008 | Kahan et al. |
| 2008/0294981 A1 | 11/2008 | Balzano et al. |
| 2009/0119678 A1 | 5/2009 | Shih et al. |
| 2009/0172626 A1 | 7/2009 | Pucci et al. |
| 2009/0259950 A1 | 10/2009 | Sullivan et al. |
| 2010/0250568 A1 | 9/2010 | Giusti |

(Continued)

OTHER PUBLICATIONS

Dr.Dobb's, asp.net vs asp.net MVC, Published Aug. 8, 2011, Dr.Dobb's , pp. 1-2 (pdf).*

(Continued)

*Primary Examiner* — Manglesh M Patel
(74) *Attorney, Agent, or Firm* — Patent Law Works LLP

(57) ABSTRACT

A method may include receiving, via a network, a request for browser-renderable content, and determining, by a processor of a computing device, a web framework, where the web framework includes at least one ASP.NET™ control and at least one ASP.NET™ MVC controller. The method may include determining, by the processor, first instructions, where the first instructions correspond to the at least one ASP.NET™ control, and the first instructions include a browser-renderable language. The method may include determining, by the processor, second instructions, where the second instructions correspond to the at least one ASP.NET™ MVC controller, and the second instructions include the browser-renderable language The method may include combining, by the processor, the first instructions and the second instructions to determine the browser-renderable content, and providing, via the network, the browser-renderable content.

20 Claims, 8 Drawing Sheets

(56) References Cited

U.S. PATENT DOCUMENTS

2011/0035728 A1   2/2011   Janczewski
2011/0145932 A1   6/2011   Nerger et al.
2011/0321010 A1   12/2011  Wang
2012/0173961 A1   7/2012   Kirkby et al.

OTHER PUBLICATIONS

Walther Stephen, asp.net MVC Controller Overview C#, published Feb. 15, 2008, Published by Microsoft.com, pp. 1-6 (pdf).*
Markic, M., Using XtraChart ASP.net Control in an asp.net MVC Project, Righthand's Blog: 5, dated 2009, 8 pages.
No Author Listed "QR Code—magicheckiy shtrikh kod" dated May 27, 2011, 3 pages.
International Search Report for PCT/IB/2013055266 (WO201400983), dated Jun. 26, 2013, 2 pages.
International Search Report and Written Opinion for PCT/IB/2013000447 (WO2013117995), dated Feb. 7, 2013, 11 pages.

* cited by examiner

CONTENT MANAGEMENT SYSTEM EMPLOYING A HYBRID WEB APPLICATION FRAMEWORK

RELATED APPLICATIONS

This application is a continuation of and claims priority to U.S. application Ser. No. 13/799,431, filed Mar. 13, 2013, titled "Content Management System Employing a Hybrid Web Application Framework," which claims the benefit under 35 U.S.C. § 119, of U.S. Provisional Patent Application No. 61/669,930, filed July. 10, 2012 and entitled "Content Management System Employing a Hybrid Web Application Framework," the entireties of which are hereby incorporated by reference.

BACKGROUND

A content management system (CMS) may provide an environment and tools for developing, publishing, and maintaining web-based content. The web-based content, in some examples, can include runtime executable application code, presentation files, and rich media files (e.g., image, audio, video, etc).

A web designer may use a web application framework to design dynamic web-based content such as, in some examples, web sites, online services, and web-based applications. Examples of web application framework products are: ASP.NET™ by Microsoft Corporation of Redmond, Wash.; Java™ Platform Enterprise Edition by Oracle of Redwood City, Calif.; web2py by The web2py Team; OpenACS by the OpenACS Community; Catalyst and Mojolicious, both by Sebastian Riedel; Ruby on Rails by Core Team; Django by the Django Software Foundation; Zend Framework by Zend Technologies of Cupertino, Calif.; and Symfony by SensioLabs of Paris, France.

The content developed within a web application framework, for example, may be rendered by a web browser application such as, in some examples, Microsoft Internet Explorer™ by Microsoft Corporation of Redmond, Wash., Google Chrome™ by Google, Inc. of Menlo Park, Calif., Mozzilla Firefox™ by Mozilla Corp. of Mountain View, Calif., Safari® by Apple, Inc. of Cupertino, Calif., and Opera™ by Opera Software ASA of Oslo, Norway. Wide Web Consortium ($W^3C$) and Web Hypertext Application Technology Working Group (WHATWG). interpreted languages such as JavaScript by Netscape Communications Corporation of Mountain View, Calif., and style sheet languages such as Cascading Style Sheets (CSS) by the $W^3C$; Browser-renderable content, in some examples, may also include rich media files (e.g., image, audio, video, etc.).

A content management system (CMS) may provide an environment and tools for developing, publishing, and maintaining browser-renderable content. In some implementations, browser-renderable content may be generated, at time of request, based in part upon a web application framework defining a frame (e.g., layout, style, background, color scheme, etc.) for presenting content (e.g., text and/or rich media). In some implementations, the content may include a combination of dynamic and static content. Dynamic content may include content that changes frequently such as, in some examples, product reviews, blog entries, and current measurements (e.g., time, temperature, geolocation coordinates of a moving body, etc.) or information based in part upon current measurements or statistics (e.g., estimated wait time, number of items remaining, current high score, present bid during an auction, etc.). Static content may include information that changes infrequently such as, in some examples, a product name, business contact information, and entity logo.

In developing a web application framework for presenting dynamic and static browser-renderable content, in some implementations, a developer may incorporate one or more controls defining behavior for generation of dynamic browser-renderable content. A control, in some implementations, may include presentation, logic, and data properties for presenting dynamic browser renderable content. The properties of a control, for example, may be described within a single file. The controls, in some implementations, may be developed within a Windows® ASP.NET™ web application framework. An ASP.NET™ control, for example, may be associated with a single file including a set of properties such as, in some examples, presentation, logic, and data properties.

In developing a web application framework for presenting dynamic and static browser-renderable content, in some implementations, a developer may incorporate one or more controllers defining behavior for generation of dynamic browser-renderable content. A controller, in some implementations, may include control (e.g., logic) parameters for presenting dynamic browser-renderable content. A controller may be combinable with a view (e.g., one or more files describing presentation properties) and a model (e.g., one or more flies describing data properties) to generate the dynamic browser renderable content. In some implementations, a developer may incorporate one or more controllers within a Windows® ASP.NET™ MVC web application framework. An ASP.NET™ MVC ("MVC") controller, for example, may be associated with logic properties, for example defining behavior within web content. The logic properties, in turn, may be applied to an MVC view (e.g., presentation properties) and/or an MVC model (e.g., data properties).

In the same web application framework, in some implementations, a combination of controls and controllers may describe the functionality for presenting dynamic browser-renderable content, in a web page. By providing the opportunity to intermingle controls and controllers, for example, a preexisting web application framework, designed using one or more controls, may be updated and. or expanded using one or more controllers. Additionally, preexisting controls can continue to be used as a web site is updated and/or expanded. In this manner, control architecture may be incrementally migrated to controller architecture, rather than having to re-write the functionality of all preexisting controls as controllers to migrate from a control-based web site design architecture to a controller-based web site design architecture.

In one aspect, the present disclosure relates to a method including receiving, via a network, a request for browser-renderable content, and determining, by a processor of a computing device, a web framework, where the web framework includes at least one ASP.NET™ control and at least one ASP.NET™ MVC controller. The method may include determining, by the processor, first instructions, where the first instructions correspond to the at least one ASP.NET™ control, and the first instructions include a browser-renderable language. The method may include determining, by the processor, second instructions, where the second instructions correspond to the at least one ASP.NET™ MVC controller, and the second instructions include the browser-renderable language The method may include combining, by the processor, the first instructions and the second instructions to determine the browser-renderable content, and providing, via the network, the browser-renderable content.

In some embodiments, the request includes a request for a Uniform Resource Identifier (URI). The web application framework may include a web form. Determining the first instructions may include executing a first process to determine the first instructions, and determining the second instructions may include executing a second process to determine the second instructions. The first process may execute substantially in parallel with the second process. Executing the second process may include spawning a separate request, based upon the request, to determine the second instructions. The first process may be executed using a first Virtual Path Provider and the second process may be executed using a second Virtual Path Provider.

In some embodiments, the browser-renderable language is HTML. Combining the first instructions and the second instructions may include accessing a presentation layout, and combining the first instructions and the second instructions according to the presentation layout. The web application framework may be modeled using at least one of a) one or more presentation files and b) one or more web application files, and the presentation layout may include at least one presentation file. The one or more presentation files may include and least one of a mark-up language file, an interpreted language file, and a style sheet file. The one or more web application files may include at least one of a Java file and a JavaScript file.

In some embodiments, the method includes, prior to determining the web application framework, determining the request relates to an identified route. The request may be a hypertext transfer request, and providing the browser-render able content may include serving at least one markup language file responsive to the hypertext transfer request.

In one aspect, the present disclosure relates to a system including a processor and a memory having instructions stored thereon, where the instructions, when executed by the processor, cause the processor to present an interface for developing a web application framework, where the interface includes a) at least one ASP.NET™ widget configured, upon selection, to add an ASP.NET™ control to the web application framework, and b) at least one MVC widget configured, upon selection, to add an ASP.NET™ MVC controller to the web application framework. The instructions, when executed, may cause the processor to receive selection of a first ASP. NET™ widget of the at least one ASP.NET™ widget, where the selection of the first ASP.NET™ widget is associated with a first content region of the web application framework, and receive selection of a first MVC widget of the at least one MVC widget, where selection of the first MVC widget is associated with a second content region of the web application framework.

In some embodiments, the first content region is the second content region. Selecting the first MVC widget may include dragging the first MVC widget into the second content region.

In one aspect, the present disclosure relates to a non-transitory computer readable medium having instructions stored thereon, where the instructions, when executed by a processor, cause the processor to determine a content composition associated with a request for a web resource, where the content composition includes at least one ASP.NET™ control and at least one ASP.NET™ MVC controller, determine first instructions, where the first instructions correspond to the at least one ASP.NET™ control, and the first instructions include a browser-renderable language, and determine second instructions, where the second instructions correspond to the at least one ASP.NET™ MVC controller, and the second instructions include the browser-renderable language. The instructions, when executed, may cause the processor to identify presentation properties associated with at least one of the content composition and the web resource, and combine the first instructions and the second instructions according to the presentation properties to determine browser-renderable content.

In some embodiments, the presentation properties include an MVC view. The instructions, when executed, may cause the processor to access, via a network, additional information, where combining the first instructions and the second instructions includes including at least a portion of the information identified by the content composition. The additional information may include one or more of data, a rich media file, and a web application.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
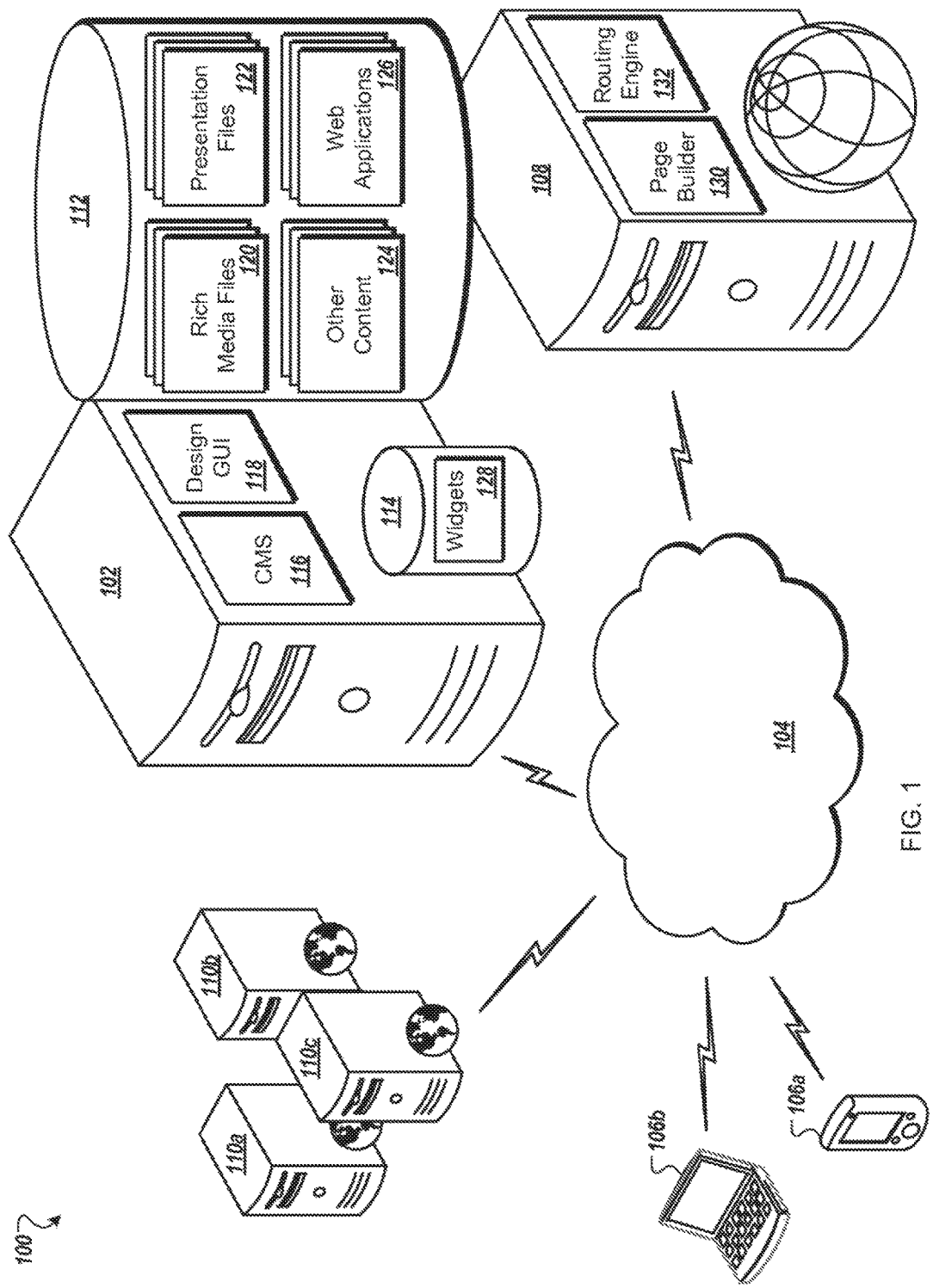
FIG. 1 is a system diagram illustrating a content management system that may be used for developing and deploying browser-renderable content based on hybrid web forms.

The features and advantages of the present disclosure will become more apparent from the detailed description set forth below when taken in conjunction with the drawings, in which like reference characters identify corresponding elements throughout, in the drawings. like reference numbers generally indicate identical functionally similar, and/or structurally similar elements.

DETAILED DESCRIPTION

Turning to FIG. 1, a system diagram illustrates an example web content management environment 100 that may be used for developing and deploying browser-renderable content based in part on hybrid web forms. A web application framework developed within the web content management environment 100, in some implementations, may include a hybrid web form identifying both one or more ASP.NET™ controls and one or more MVC controllers.

A developer may connect to the web content management environment 100 provided, in part, through a development server 102 connected by a network 104 to a development device 106, such as a wireless computing device 106a or personal computer 106b. In some implementations, a web content development client application may be installed upon one of the development devices 106. The developer, in some implementations, may access a browser-based web content development tool via a browser application. For example, the development server 102 may provide a web content design graphical user interface (GUI) 118 via a browser application executing upon one of the development devices 106.

The development server 102, in some implementations, may include a content management system (CMS) 116 for managing web-based content such as, in some examples, one or more web applications 126, presentation files 122, rich media files 120, and other web-based content 124. In some implementations, one or more storage devices such as a storage medium 112 may be used by the CMS 116 to organize and maintain the web applications 126, presentation files 122, rich media files 120, and/or other web-based content 124.

In designing web-based content, in some implementations, a developer may include one or more widgets 128 in a web application framework, such as a web form. The widgets 128, in some implementations, may include functions designed as ASP.NET™ controls and MVC controllers. In some implementations, the web content design GUI 118 may present one or more of the widgets 128 as user-selectable controls within a web content design environment. For example, a developer may drag and drop a widget icon onto a web page template when developing a web application framework. In some examples, the widgets 128 may include content presentation layout templates (e.g., columns and/or rows, scrolling content, a content carousel, etc.), rich media content templates (e.g., an image, image gallery, video, video gallery, etc.), user-interactive information templates (e.g., form, password input, biometric input, etc.). and dynamic information templates (e.g., news, blog, forum, calendar, etc.). Data regarding the widgets 128 (e.g., presentation files, application files, and other files defining, representing, and/or demonstrating a particular widget 128), in some implementations, may be maintained within a widget repository 114 (e.g., a storage medium included in die development server 102 or accessible to the development server 102).

In some implementations, a developer may be provided the opportunity to create a new widget 128 or modify an existing widget 128 to provide enhanced functionality pf the widget 128. For example, a developer may be provided with one or more presentation files 122 and/or web applications 126 for designing a widget. In some implementations, the widgets 128 may be developed or generated in a .NET-compliant programming language such as, in some examples. Visual Basic .NET™ (VB.NET™) by Microsoft Corporation of Redmond, Wash., C# by Microsoft Corporation, C# Razor Syntax by Microsoft Corporation, C++ by Bjarne Stroustrup, and Python by the Python Software Foundation.

In some implementations, the developer may specify a type of widget to use and/or create. For example, the developer may be presented the opportunity by the web content design GUI 118 to work in ASP.NET™, MVC, or access a mixture of both styles of controls/controllers.

In some implementations, upon defining a web application framework using the widgets 128, the web content design GUI 118 may generate one or more presentation files 122 and/or web applications 126. For example, a developer may create a web application framework incorporating one or more widgets 128. The web application framework may be modeled using one or more presentation flies 122 and/or web application files 126. The web application framework may define the functionality and content to be presented to a requestor in response to a request for a particular uniform resource identifier (URI) such as a uniform resource locator (URL) (e.g., web address).

In some implementations, the developer may be provided the opportunity to test and/or model the functionality of the web application framework through the design GUI 118. For example, hyperlinks within the presentation files 122 may be tested for validity, or two or more widgets 128 may be determined to interfere (e.g., presentation properties conflict, etc.). In modeling the functionality, in some examples, the developer may determine that particular social links are displayed and enabled, a selected template (e.g., include publication date, particular entity logo layout, etc.) is applied appropriately, and/or user authentication rules are being applied as desired. If a widget is associated with a rich media file, such as an image or video, the developer may determine that the appropriate rich media file is presented. If a widget is configured lo display a list of items, such as news stories or blog entries, in some implementations, the developer may model the functionality of me web application framework to determine that a selected number of items are displayed within a view, the items arc displayed in a selected order (e.g., by timestamp, by popularity, by title, etc.), and/or the items are displayed according to a selected template (e.g., spacing, font, positioning, title and author presentation, etc.).

In some implementations, a web server 108 may access one or more files contributing to a web application framework such as, in some examples, the web applications 126, presentation files 122, rich media files 120, and other content 124, in dynamically generating browser-renderable content in response to a request for a URI or URL. For example, upon receipt of a request for a URL, a routing engine 132 of the web server 108 may first determine that the URL relates to a route handled by the web server 108. Upon recognition of the URL, a page builder engine 130 of the web server 108 may dynamically build browser-renderable content based in part upon the web application framework defined by one or more of the presentation files 122 and/or web applications 126. For example, the web server 108 may access the storage medium 112 to retrieve one or more files associated with the requested URL. The page builder engine 130 may generate browser-renderable content such as, in some examples, HTML files, CSS files, and/or JavaScript algorithms responsive to the URL request.

Upon recognition of one of the widgets 128, the page builder engine 130 may generate browser-renderable content defining the presentation, logic, and/or data associated with the widget 128. For example, the page builder engine 130 may generate HTML statements corresponding to the functionality of the particular widget 128.

In some implementations, if one or more widgets 128 have been used to define the web application framework associated with the requested URL, the page builder engine 130 may execute two or more processes, each generating browser renderable content in relation to one or more particular widgets 128. For example, a first process may generate HTML statements corresponding to any ASP.NET™ widgets, while a second process may generate HTML statements corresponding to any MVC widgets. In some implementations, the processes may be performed using individual Virtual Path Providers, similar to the VirtualPathProvider functionality built into the ASP.NET™ MVC framework. Although the ASP.NET™ MVC framework provides for a single VirtualPathProvider per web page content composition, in executing two or more Virtual Path Providers, multiple MVC controllers may be included within the web application framework defining a particular web page or a combination of MVC controllers and ASP. NET™ controls may be included within the web application framework defining a particular web page. Returning to the example, upon completion of the first process and the second process, the page builder engine 130 may combine the generated HTML statements, according to presentation layout specifications, into a single HTML document for service to the requestor.

In some implementations, one or more widgets 128 and/or web applications 126 may be configured to access information external to the development server 102 and web server 108. In some implementations, the page builder engine 130, when generating browser-renderable content in response to a requested URL may access external information from one or more networked sources 110, such as external web servers, storage devices, and/or other network-accessible computing devices. For example, upon request for a URL associated with content determined in part through a widget for presenting a current geolocation of a public transit bus, the page builder engine 130 may access a public transit server 110*b* to request the geo-coordinates of the specified public transit bus. In some implementations, one or more of the networked sources 110 may be private network sources. For example, the web server 108 may access security information (e.g., stored as oilier content 124 in the storage medium 112) used to access a private network source 110.

In some implementations, one or more of the networked sources 110 may include a routing engine. If the routing engine 132 receives a request for an unrecognized URI, in some implementations, the routing engine 132 may access one of the networked sources 110 to attempt to resolve the destination for the request.

Figure 2:
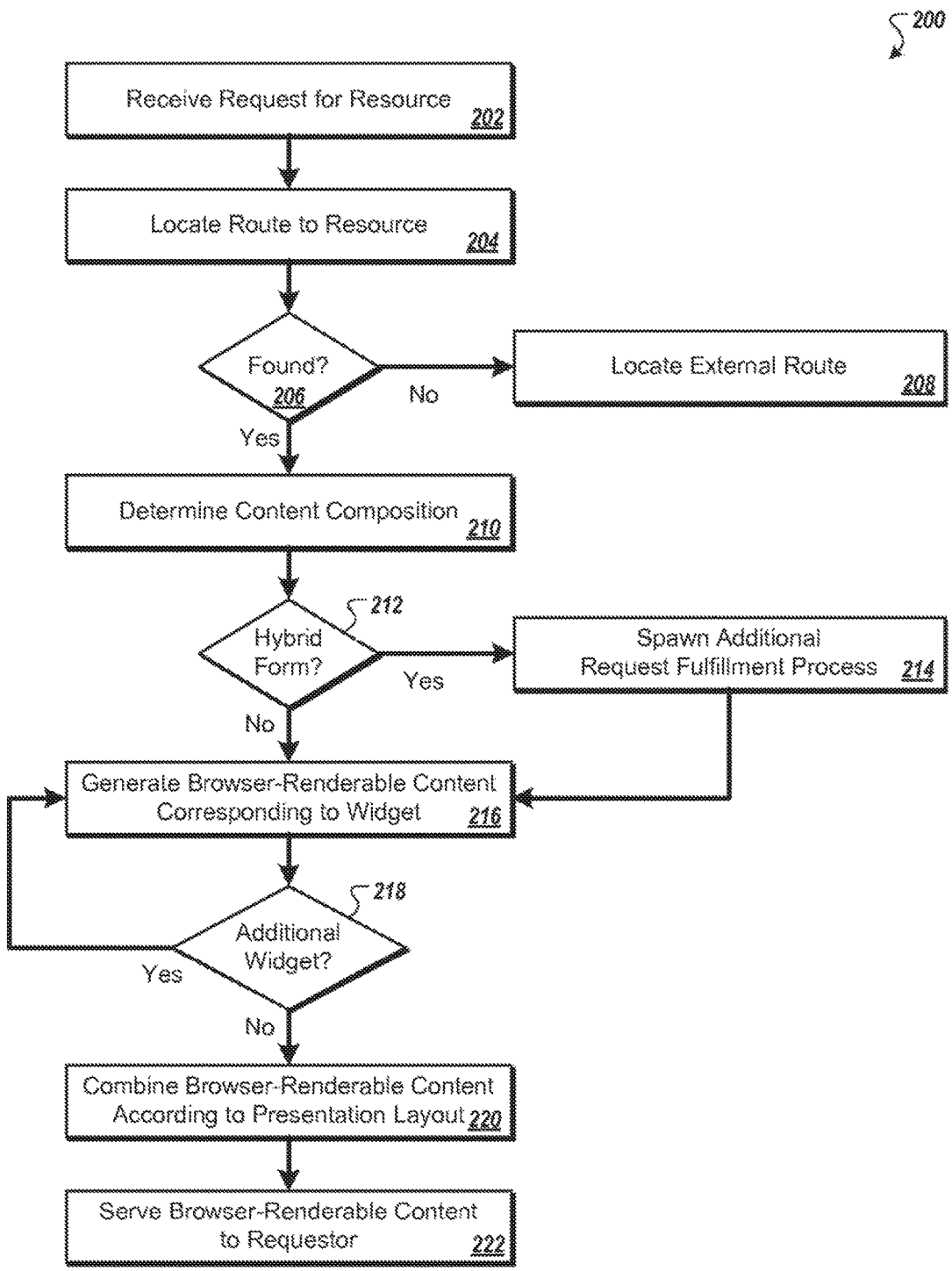
FIG. 2 is a flow chart illustrating an example method that may be used for deploying browser-renderable content based on hybrid web forms.

As shown in FIG. 2, a flow chart illustrates an example method 200 that may be used, in some implementations, for deploying browser-renderable content based on hybrid web forms. In some implementations, the method 200 may be performed by the web server 108, as described in relation to FIG. 1.

In some implementations, the method 200 may begin with receiving a request for a web resource (202). The request, in some implementations, may include a URI or URL indicating particular web content. In some implementations, the request may be received by a routing engine, such as the routing engine 132 described in relation to FIG. 1.

In some implementations, a route to the resource may be located (204). In some implementations, a routing engine may resolve an address indicated by the request, such as a URI or URL. The route, for example, may be resolved through a look up to a routing table maintained by a content management system such as the CMS 116 described in relation to FIG. 1.

In some implementations, if the route has not been located (206), an external route may be located (208). The external route, in some implementations, may be determined through forwarding the request to an external routing engine. For example, the routing engine 132, as described in relation to FIG. 1, may forward the request to a particular networked source 110 via the network 104. The route, for example, may be resolved at the networked source 110 through a look up to a routing table.

If the route has been located (206), in some implementations, a web content composition may be determined (210). In some implementations, a web application framework may be identified for generating content responsive to the request. The web application framework, for example, may provide information regarding the composition of the web content such as, in some examples, logic, data, and presentation properties regarding the web content. The web content composition, in some implementations, may include a web form identifying one or more of the logic, data, and presentation properties regarding the web content. The web form, for example, may include one or both of an ASP. NET™ control and an MVC controller.

In some implementations, if the composition contains a hybrid form of both ASP.NET™ controls and MVC controllers (212), an additional request fulfillment process may be spawned (214). In some implementations, a first process may generate browser-renderable content based upon properties defined by one or more ASP.NET™ controls, while a second process may generate browser-renderable content based upon properties defined by one or more MVC controllers. For example, if a web form contains one ASP.NET control and two MVC controllers, a first process may generate browser-renderable content responsive to the properties identified by the ASP.NET™ control, while a second process may generate browser-renderable content responsive to the properties identified by the MVC controllers. In some implementations, browser-renderable content responsive to the properties associated with each control and/or controller may be generated by separate processes. For example, if a web form includes three ASP.NET™ controls and one MVC controller, a total of four processes may be launched in parallel, each process generating browser-renderable content responsive to a particular controller or control In some implementations, the processes may be performed using individual Virtual Path Providers, similar to the VirtualPathProvider functionality built into the ASP. NET™ MVC framework.

In some implementations, for each widget included within the web content composition (218), browser-renderable content corresponding to a control or controller may be generated (216). In some implementations, generation of browser-renderable content may include preparing markup language responsive to the properties associated with each control and/or controller. For example, HTML or HTML5 statements may be prepared to present content corresponding to each controller and/or control. A page building engine, such as the page builder engine 130 described in relation to FIG. 1, in some implementations, may coordinate the execution of the one or more processes preparing markup language responsive to the controls and/or controllers.

In some implementations, application code or rich media files corresponding to one or more controls and/or controllers may be retrieved. For example, the page builder 130 may retrieve rich media files 120, web applications 126 and/or other content 124 responsive to one or more controls and/or controllers. In some implementations, content responsive to one or more controls and/or controllers may be retrieved from an external source. For example, data, rich media files, web applications, or other content may be retrieved by the page builder 130 from one of the networked sources 110. The retrieved content, in some implementations, may be combined with the generated markup language. For example, a rich media file or application may be added into HTML statements via an HTML tag (e.g., the hyperlink tag "HREF", etc.).

In some implementations, the browser-renderable content may be combined according to the presentation layout (220). In some implementations, one or more of the controls and/or controllers may be associated with presentation properties. The presentation properties, in some implementations, may be associated with the web form or web application framework. For example, a web form generated using a visual development tool may identify positions for each widget (e.g., control and/or controller) placed within the web form. The presentation properties, for example, may be defined in part within a style sheet. The individually-prepared markup language, in some implementations, may be combined within a single file according to the layout properties.

In some implementations, the browser-renderable content may be served to the requestor (222). In some implementations, a markup language file responsive to the content composition associated with the resource request may be provided to the requestor. For example, the markup language File may include statements corresponding to the one or more ASP.NET™ controls and/or MVC controllers identified within the content composition (e.g., web form and/or web application framework). In some implementations, a content server, such as the web server 108 described in relation to FIG. 1, may provide the browser-renderable content to the requestor (e.g., one of the computing devices 106) via the network Although described in a particular series of steps, in some implementations, one or more steps of the method 200 may be added or removed, or one or more of the steps may be performed in a different order, while maintaining the spirit and scope of the method 200.

Figure 3A:
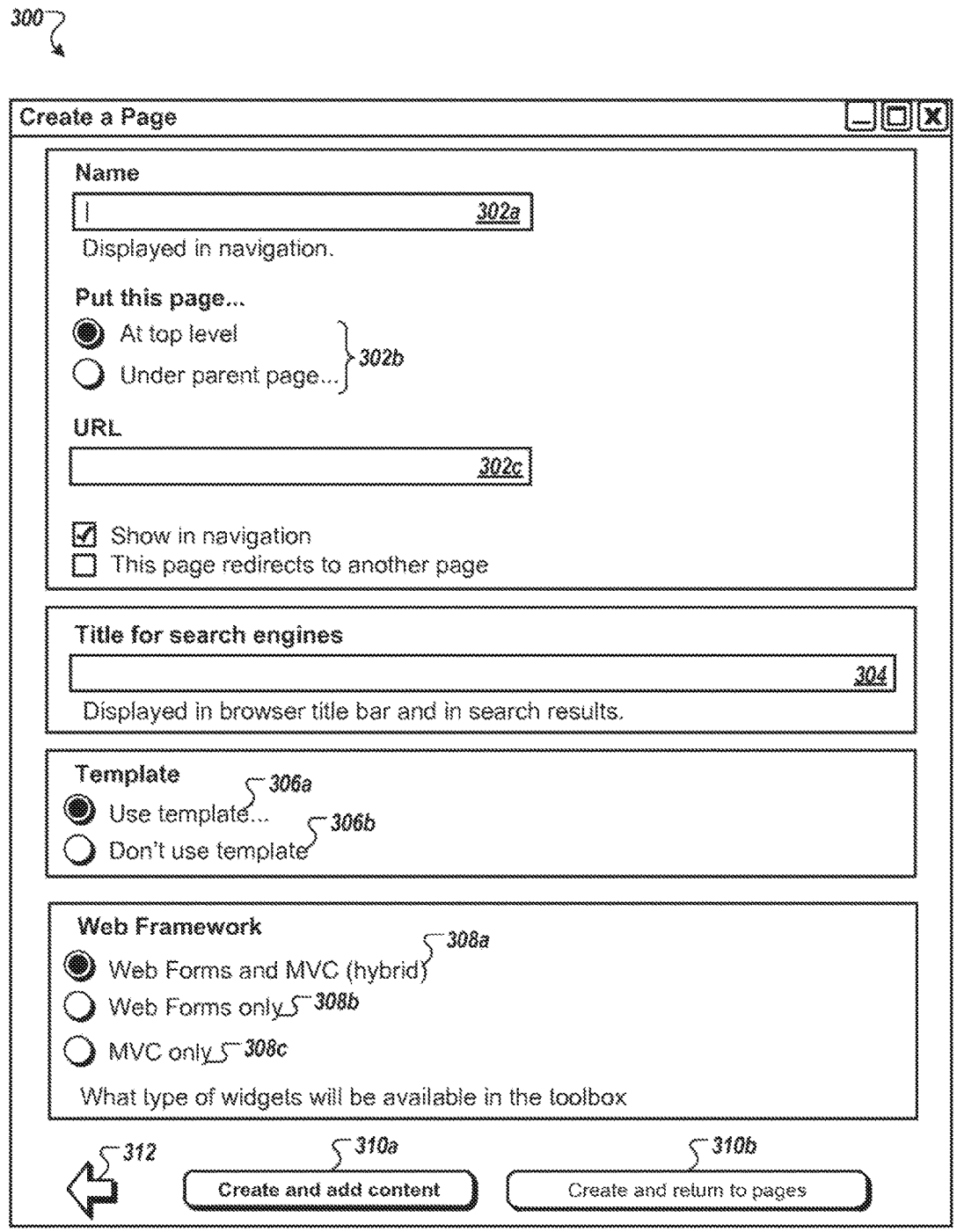
FIGS. 3A through 3C are screen shots illustrating example interfaces for developing browser-renderable content based on hybrid web forms.
Figure 3B:
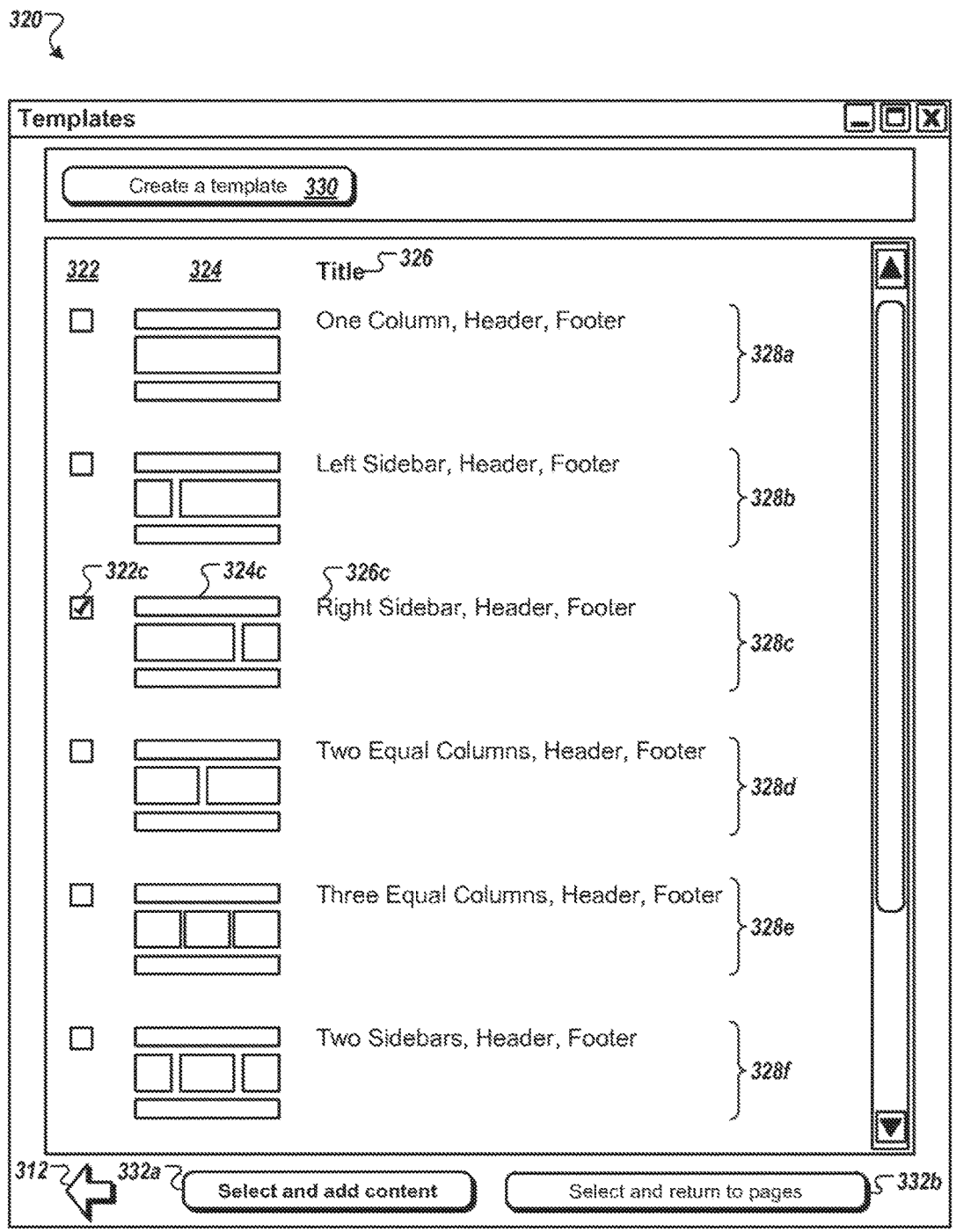
Figure 3C:
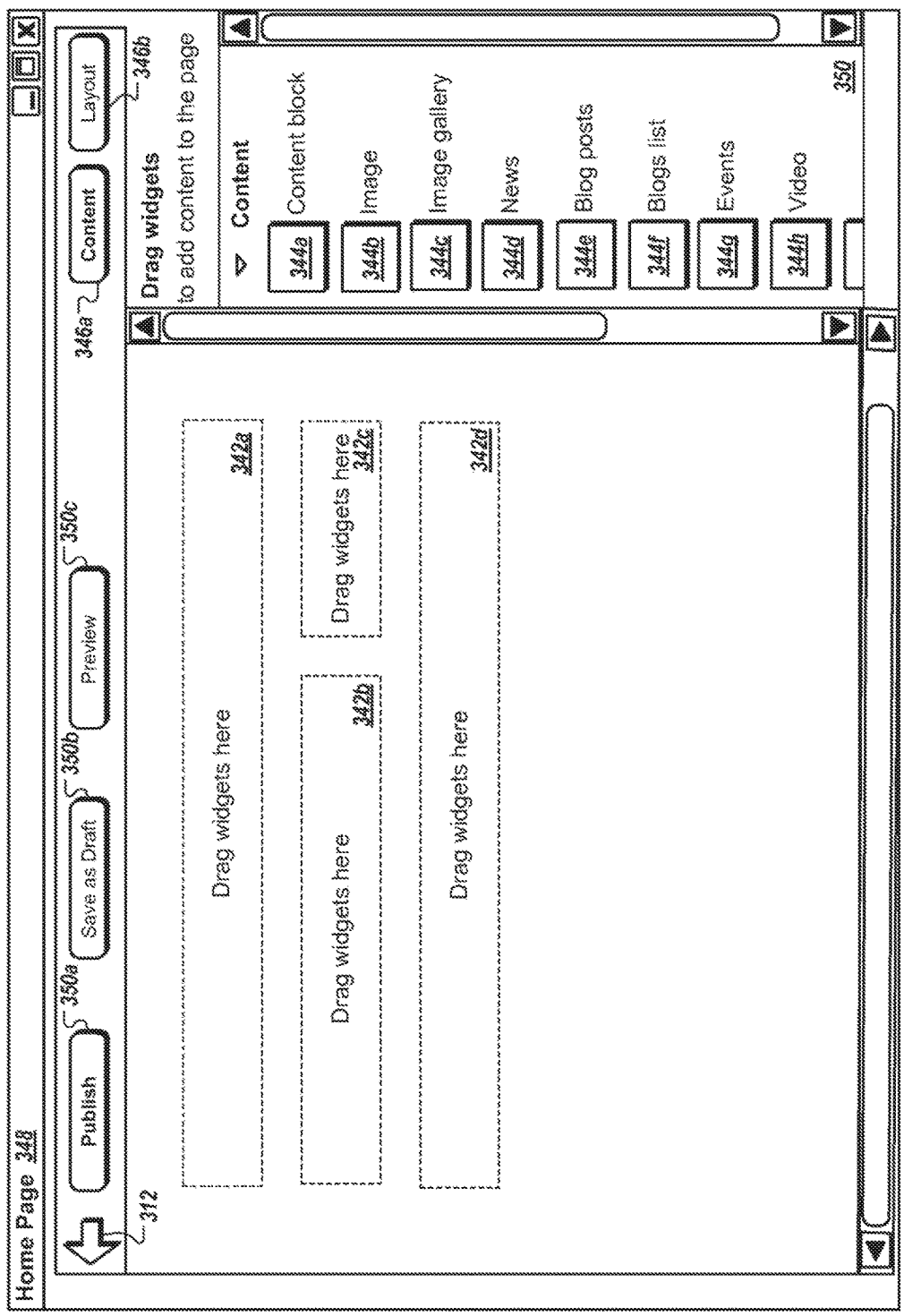

FIGS. 3A through 3C, in some implementations, may illustrate screen shots of a series of example interfaces for developing browser-renderable content based on hybrid web forms identifying both ASP.NET™ controls and MVC controllers. The screen shots, for example, may illustrate example user interfaces generated by the web content design GUI 118 described in relation to FIG. 1.

Turning to FIG. 3A, a first screen shot 300, in some implementations, may illustrate a user interface for initiating the creation of a new web page framework. At the top of the first screen shot 300, a developer, in some implementations, may specify basic web page information 302 such as, in some examples, a web page name 302a, a hierarchical position 302b within a web site, and a URL 302c. Beneath the basic web page information 302, a developer may specify a detailed title 304, for example to be displayed in a browser title bar or in web search results.

To create the new web page framework, in some implementations, the developer may be provided the option of using a web application framework template, for example via a set of template selection controls 306. In selecting a template, in some implementations, a developer may be presented with one or more of template layout options, template presentation options, and template control logic options. In some implementations, selection of a "use template" control 306a may result in navigation to a screen shot 320, illustrated in FIG. 3B.

Beneath the template presentation options, in some implementations, the developer may be presented with a series of web application framework controls 308. The web application framework controls 308, for example, may allow the developer to specify the type of widgets to use when building the new web page. In some implementations, the developer may be presented with the opportunity to select a hybrid framework, including both ASP.NET™ controls and MVC controllers, using a first web application framework control 308a. Upon selection of a second web application framework control 308b, in some implementations, the developer may be provided with the opportunity to limit available widgets to those associated with ASP.NET™ controls only. Similarly, upon selection of a third web application framework control 308c, in some implementations, the developer may be provided the opportunity to limit available widgets to those associated with MVC controllers only.

Upon satisfactory completion of the input options within the screen shot 300, in some implementations, the developer may select a "Create and add content" control 310a, for example to further define the properties (e.g., logic, presentation, data, etc.) of the new web page. Conversely, the developer, in some implementations, may select a "create and return to pages" control 310b, for example to continue adding pages to the web site. Rather than creating a new web page via one of the controls 310, in some implementations, the developer may select a back control 312, for example to navigate away from the screen shot 300 without modifying an underlying web site.

In some implementations, for example upon selection of the "Create and add content" control 310a, the developer may be presented with the screen shot 320 for selecting a page layout template. Turning to FIG. 3B, the screen shot 320, in some implementations, may present a developer with a series of template options 328 for positioning layout of web page content. Each template option 328, in some implementations, may be associated with a layout configuration 324, a title 326, and a selection control 322. For example, a selected template option 328c may be associated with a layout 324c illustrating four content regions, and a title 326c of "Right Sidebar, Header, Footer." Upon selection of the template option 328c, for example by activating an associated control 322c, the developer may designate the layout 324c for partitioning the new web page into content regions.

In some implementations, rather than selecting an existing template 328, the developer may activate a "Create a template" control 330 to designate a. custom content region layout. In one example, a developer, through selection of the "Create a template" control 330. may be provided the opportunity to identify a number of rows and/or columns of content regions. The developer, further, may be provided the opportunity to Specify relative dimensions of various content regions within a custom content region layout.

The developer may activate a "Select and add content" control 332a, in some implementations, to add the activated template 328c to the web page design and to continue to add design options to the new web page. Alternately, the developer, in some implementations, may activate a "Select and return to pages" control 332b to add the activated template 328c to the web page design and to discontinue further development within the present web page. Rather than adding a layout template to the web page via one of the controls 332, in some implementations, the developer may select the back control 312, for example to navigate away from the screen shot 320 without modifying an underlying web site. In some implementations, selection of the back control 312 may navigate the developer back to the screen shot 300 described in relation to FIG. 3A.

Upon selection of the "Select and add content" control 332a, in some implementations, the developer may be navigated to a third screen shot 340 for indicating content within each of the content regions of the web page. Turning to FIG. 3C, the third screen shot 340 may provide the developer with the opportunity to populate one or more content regions 342 of the web page (e.g., "Home Page", as indicated in a title bar 348) with content widgets 344. The content widgets 344, in some implementations, may each represent either an ASP.NET™ control or an MVC controller. The content widgets 344, in some implementations, may be provided as template widgets within a web content design application such as. for example, the widgets 128 accessible by the web content design GUI 118, as described in relation to FIG. 1. In some implementations, a developer may be provided the opportunity to modify an existing widget (e.g., alter the functionality of the existing widget to suit particular needs) or to add one or more new widgets.

As indicated within each of the content regions 342, a selected widget 344 may be dragged and dropped from a widget menu 350 onto a particular content region 342. In some implementations, upon adding one of the widgets 344 to one of the content regions 342, a preview mode or demonstration mode of the widget may be activated, for example to illustrate the functionality of the selected widget. In some implementations, upon addition of one of the widgets 344 to one of the content regions 342, the developer may be provided the opportunity to indicate features, preferences, or settings related to the selected widget 344. For example, upon moving an image gallery widget 344c into a content region 342b, the developer may be provided the opportunity to select a location (e.g., URL, storage folder, etc.) for accessing images to include within the image gallery.

In some implementations, when the image gallery widget 344c is added to the content region 342b, within the web application framework of the new web page, application, code may be added, providing the functionality of the image gallery widget 344c. For example, a .NET-compliant programming language file containing instructions for generating the new web page may be amended to include instructions for generating the ASP.NET™ control or MVC controller associated with the image gallery widget 344c.

In some implementations, more than one widget may be presented for each feature. For example, both an ASP.NET™ control version of a video gallery widget and an MVC controller version of a video gallery widget may be provided. The individual versions, for example, may be labeled or otherwise visually identifiable as either an ASP.NET™ control or an MVC controller. The developer, in some implementations, may be prompted to select whether to add as an ASP.NET™ control or an MVC controller, for example upon dropping a selected widget 344 within a particular content region 342.

While populating the content regions 342 with widgets 344, in some implementations, the developer may select a "Save as Draft" control 350b, for example to save the work in progress. Saving the work in progress via the "Save as Draft" control 350b, for example, may involve storing files related to the web application framework, such as presentation files and/or web applications. For example, one or more presentation files 127 and/or web applications 126 may be saved to the storage medium 112, as described in relation to FIG. 1.

Upon adding one or more widgets to one or more content regions, in some implementations, the developer may select a "Preview" control 350c, for example to view the work in progress as a web page. In some implementations, upon activation of the "Preview" control 350c, the developer may be presented with the new web page in a browser. For example, a page builder engine such as the page builder engine 130 described in relation to FIG. 1 may generate browser-renderable content based upon the current version of the web application framework defining the new home page. The page builder engine 130, further to the example, may serve the browser-renderable content to a browser application executing upon a development computing device. In some implementations, the developer may be presented with a preview within the current application (e.g., replacing, overlaid upon, or otherwise rendered by the application including the screen shot 340).

The developer may select a "Publish" control 350a, in some implementations, to publish the new web page, for example within a web site. The web site, in some examples, may be a public (e.g., Internet) site or a private (e.g., Intranet) site. In some implementations, upon selection of the "Publish" control 350a, a routing engine such as the routing engine 132 described in relation to FIG. 1 may be made aware of the new web page. For example, the URL of the new web page may be added to a routing table within a content management system, such as the CMS 116 described in relation to FIG. 1.

In some implementations, selection of the back control 312 may navigate the developer back to the screen shot 320 described in relation to FIG. 3B. In some implementations, the back control 312, upon selection, may provide the developer the opportunity to undo a most recent modification to the web page template. For example, if the developer most recently dragged and dropped an events widget 344g into a footer content region 342d, activation of the back control 312 may undo the addition of the events widget 344g to the web page template.

Figure 4:
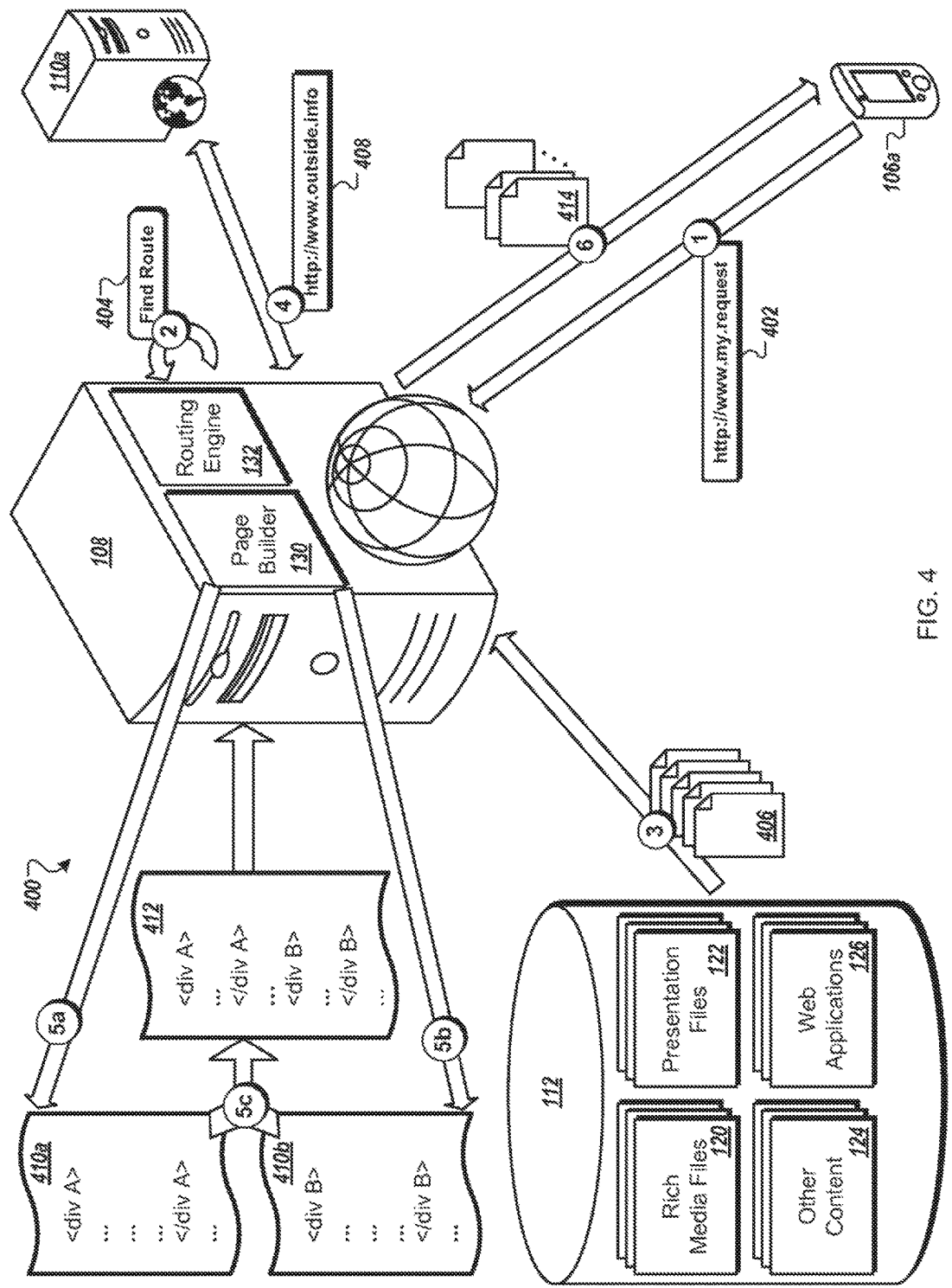
FIG. 4 is a flow diagram illustrating an example method that may be used for deploying browser-renderable content based on hybrid web forms.

FIG. 4 is a flow diagram illustrating an example method 400 that may be used for deploying browser-renderable content based on hybrid web forms. The method 400, in some implementations, may be performed by the web server 108, as described in relation to FIG. 1. As shown, the method may begin with receiving a request 402 from the wireless computing device 106a at the web server 108. The request, in some implementations, may be in the form of a URL (e.g., http://www.mv.request). In some implementations, the routing engine 132 may receive the request 402 from the wireless computing device 106a, for example via a network (not illustrated).

The routing engine 132 may execute a route lookup 404 in relation to the request 402. For example, the routing engine 132 may compare the request 402 to entries within a routing table, in some implementations, the routing engine 132 may identify a web page framework associated with the request 402.

Based upon the identified web page framework, in some implementations, the page builder engine 130 may access one or more content composition files 406 such as, in some examples, one or more presentation files 122 and/or web applications 126. The content composition files 406, for example, may be retrieved by the page builder engine 130 from the storage medium 112. In some implementations, a portion of the content composition files 406 may describe a web application framework and/or a web form.

Using the content composition files 406, in some implementations, the page builder engine 130 may generate instructions 410 (e.g., markup language statements) related to the web page framework. In some implementations, the page builder engine 130 may identify one or more ASP.NET™ controls and one or more MVC controllers included within the content composition files 406. The page builder engine 130, in some implementations, may initiate separate request fulfillment processes, including a first process for generating markup language associated with the one or more ASP.NET™ controls and a second process for generating markup language associated with the one or more MVC controllers. For example, the first process may generate a set of first instructions 410a, while the second process may generate a set of second instructions 410b. In some implementations, the first instructions 410a may be generated in parallel with the generation of the second instructions 410b.

In some implementations, the processes may be performed using individual Virtual Path Providers, similar to the VirtualPathProvider functionality built into the ASP.NET™ MVC framework.

Upon generating both the first instructions 410a and the second instructions 410b, the page builder engine 130 may combine the first instructions 410a and the second instructions 410b to determine combined instructions 412. In some implementations, the page builder engine 130 may combine the first instructions 410a and the second instructions 410b according to presentation properties. The presentation properties, in some implementations, may be included within the composition files 406. For example, based upon relative positioning within the graphical user interface of a browser, a portion of the first instructions 410a may be positioned prior to a portion of the second instructions 410b within the combined instructions 412, and vice versa.

The page builder engine 130 may include additional information with the combined instructions 412, in some implementations, to determine a markup language file responsive to the request 402. In some implementations, the page builder engine 130 may access information from the networked source 110a, for example using an information request 408. In some implementations, the request 408 may retrieve data, one or more rich media files, and/or one or more web applications from the networked source 110a. The page builder engine 130, in some implementations, may modify the contents of the combined instructions 412 and/or add to the combined instructions 412 based upon the external information retrieved from the networked source 110a.

In some implementations, the page builder engine 130 may prepare the combined instructions 412 within browser-renderable content 414 for service to the wireless computing device 106a in response to the request 402. For example, a markup language file, such as an HTML or HTML5 file, may be prepared as browser-renderable content 414 and served to the wireless computing device 106a by the web server 108. In some implementations, the browser renderable content 414 may include a single (e.g., markup language) file. In some implementations, the browser-renderable content 414 may include a number of files such as, in some examples, presentation files and rich media files.

Figure 5:
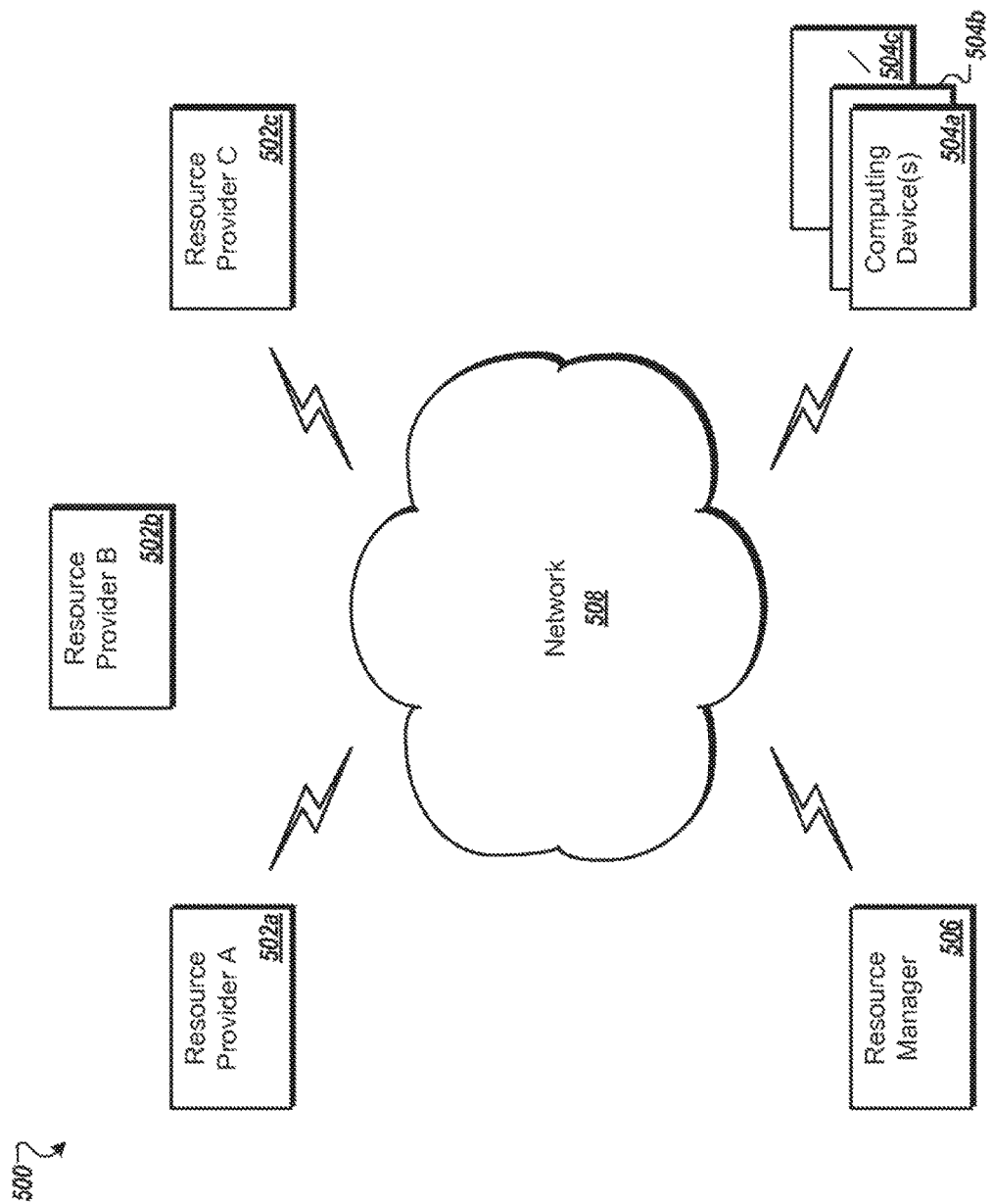
FIG. 5 is a block diagram of an example network environment for developing and deploying browser-renderable content based on hybrid web forms.

As shown in FIG. 5, an implementation of an exemplary cloud computing environment 500 for developing and deploying browser-renderable content based on hybrid web forms is shown and described. The cloud computing environment 500 may include one or more resource providers 502a, 502b, 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
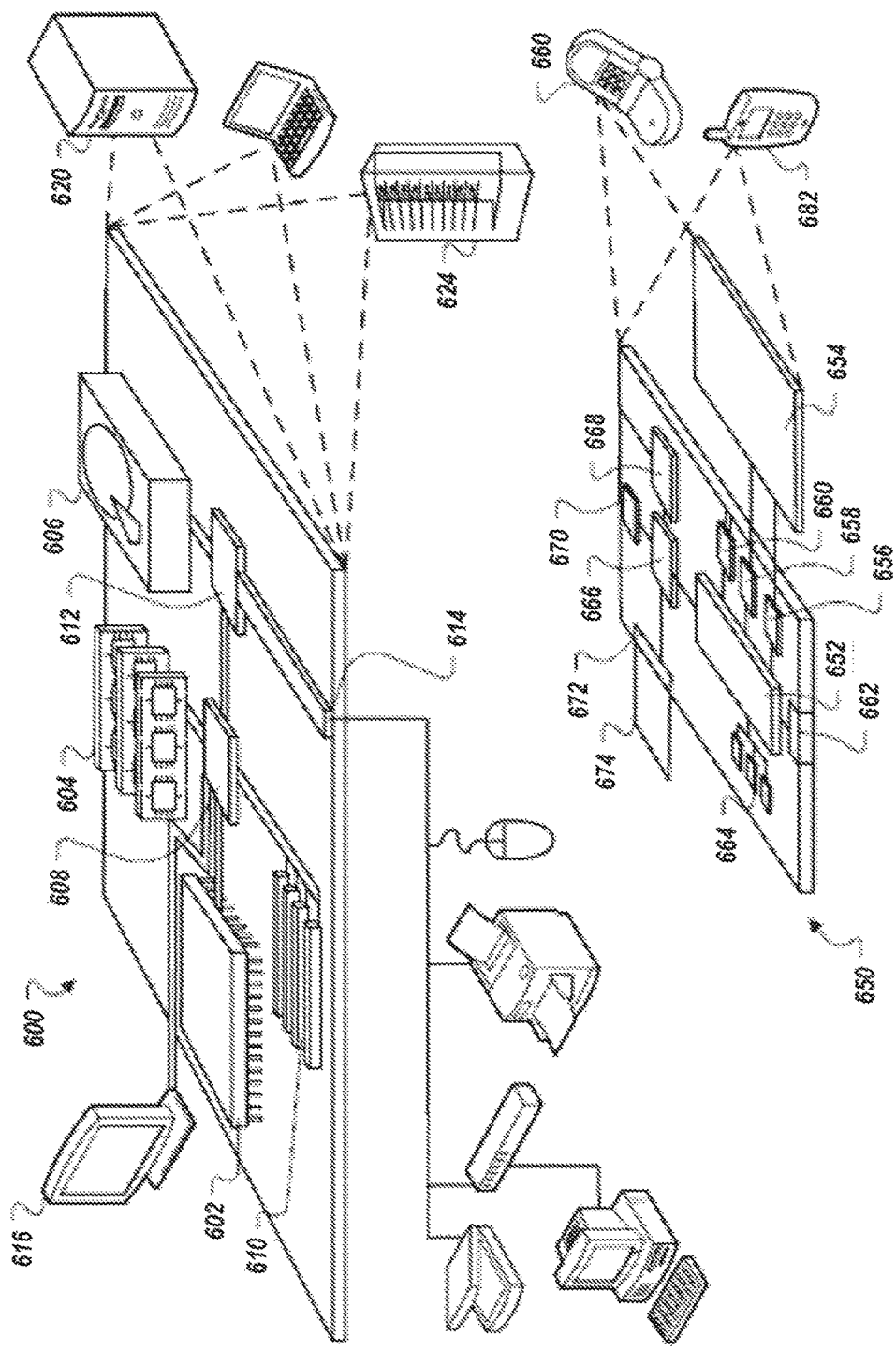
FIG. 6 is a block diagram of an example computing device and an example mobile computing device.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a Server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk. The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal Computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission lo the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or unite, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also blown as programs, software, software applications or code) include machine instructions tor a programmable processor, and can be implemented in a high-level procedural and/or object-oriented programming language, and/or in assembly/machine language. As used herein, the terms machine-readable medium and computer readable medium refer to any computer program product, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interlace or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, environments and methods for developing and deploying browser-renderable content based on hybrid web forms are provided. Having described certain implementations of methods and apparatus for supporting the development and deployment of browser-renderable content based on hybrid web forms, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
   determining, by a processor of a computing device, an existing web application framework including a first ASP.NET™ control;
   receiving, by the processor, a request to add an ASP.NET™ MVC controller to the existing web application framework comprising the ASP.NET™ control; and
   adding the ASP.NET™ MVC controller to the existing web application framework to create a modified web application framework, such that, responsive to a request for browser-renderable content associated with the modified web application framework, first instructions corresponding to the first ASP.NET™ control and comprising a browser-renderable language are generated, second instructions corresponding to the ASP.NET™ MVC controller and comprising the browser-renderable language are generated, and the first instruction are combined with the second instructions to determine the browser-renderable content.

2. The method of claim 1, wherein the ASP.NET™ MVC controller, when added, replaces a second ASP.NET™ control, the existing web application framework including the second ASP.NET™ control and the modified web application framework lacking the second ASP.NET™ control.

3. The method of claim 1, wherein the request for browser-renderable content comprises a request for a Uniform Resource Identifier (URI).

4. The method of claim 3, further comprising, prior to determining the modified web application framework, determining the request relates to an identified route.

5. The method of claim 1, wherein:
   the request for browser-renderable content is a hypertext transfer request; and
   providing the browser-renderable content comprises serving at least one markup language file responsive to the hypertext transfer request.

6. The method of claim 1, wherein the modified web application framework comprises a web form.

7. The method of claim 1, comprising:
   executing a first process to determine the first instructions comprising a browser-renderable language; and
   executing a second process to determine the second instructions comprising a browser-renderable language; and wherein the first process executes substantially in parallel with the second process.

8. The method of claim 7, wherein executing the second process comprises spawning a separate request, based upon the request for the browser-renderable content, to determine the second instructions.

9. The method of claim 7, wherein the first process is executed using a first Virtual Path Provider and the second process is executed using a second Virtual Path Provider.

10. The method of claim 7, wherein the browser-renderable language is HTML.

11. The method of claim 1, wherein combining the first instructions and the second instructions comprises accessing a presentation layout, and combining the first instructions and the second instructions according to the presentation layout.

12. The method of claim 11, wherein:
the modified web application framework is modeled using at least one of a) one or more presentation files and b) one or more web application files; and
the presentation layout comprises at least one presentation file.

13. The method of claim 12, wherein the one or more presentation files comprise at least one of a mark-up language file, an interpreted language file, and a style sheet file.

14. The method of claim 12, wherein the one or more web application files comprise at least one of a Java file and a JavaScript file.

15. A system comprising:
a processor; and
a memory having instructions stored thereon, wherein the instructions, when executed by the processor, cause the processor to:
determine an existing web application framework including a first ASP.NET™ control;
receive a request to add an ASP.NET™ MVC controller to the existing web application framework comprising the ASP.NET™ control; and
add the ASP.NET™ MVC controller to the existing web application framework to create a modified web application framework, such that, responsive to a request for browser-renderable content associated with the modified web application framework, first instructions corresponding to the first ASP.NET™ control and comprising a browser-renderable language are generated, second instructions corresponding to the ASP.NET™ MVC controller and comprising the browser-renderable language are generated, and the first instruction are combined with second instructions to determine the browser-renderable content.

16. The system of claim 15, wherein the ASP.NET™ MVC controller, when added, replaces a second ASP.NET™ control, the existing web application framework including the second ASP.NET™ control and the modified web application framework lacking the second ASP.NET™ control.

17. The system of claim 15, wherein the instructions, when executed by the processor, cause the processor to:
execute a first process to determine the first instructions comprising a browser-renderable language; and
execute a second process to determine the second instructions comprising a browser-renderable language; and
wherein the first process executes substantially in parallel with the second process.

18. The system of claim 15, wherein the modified web application framework comprises a web form.

19. The system of claim 15, wherein the request for browser-renderable content comprises at least one of a request for a Uniform Resource Identifier (URI) and a hypertext transfer request.

20. A non-transitory computer readable medium having instructions stored thereon, wherein the instructions, when executed by a processor, cause the processor to:
determine an existing web application framework including a first ASP.NET™ control;
receive a request to add an ASP.NET™ MVC controller to the existing web application framework comprising the ASP.NET™ control; and
add the ASP.NET™ MVC controller to the existing web application framework to create a modified web application framework, such that, responsive to a request for browser-renderable content associated with the modified web application framework, first instructions corresponding to the first ASP.NET™ control and comprising a browser-renderable language are generated, second instructions corresponding to the ASP.NET™ MVC controller and comprising the browser-renderable language are generated, and the first instruction are combined with second instructions to determine the browser-renderable content.

* * * * *